US006587487B2

(12) United States Patent
Yin

(10) Patent No.: US 6,587,487 B2
(45) Date of Patent: Jul. 1, 2003

(54) HARMONIC LASER

(75) Inventor: Yusong Yin, Bohemia, NY (US)

(73) Assignee: Photonics Industries International, Inc., Bohemia, NY (US)

( * ) Notice: Subject to any disclaimer, the term of this patent is extended or adjusted under 35 U.S.C. 154(b) by 189 days.

(21) Appl. No.: 09/741,137

(22) Filed: Dec. 19, 2000

(65) Prior Publication Data

US 2003/0035448 A1 Feb. 20, 2003

(51) Int. Cl.⁷ ............................................. H01S 3/102
(52) U.S. Cl. .............................. 372/22; 372/23; 372/98
(58) Field of Search ............................. 372/22, 21, 23, 372/98, 99, 107; 606/11

(56) References Cited

U.S. PATENT DOCUMENTS

| | | | | |
|---|---|---|---|---|
| 4,413,342 A | * | 11/1983 | Cohen et al. ................. | 372/22 |
| 5,198,837 A | * | 3/1993 | Ikshizaka et al. ............. | 372/22 |
| 5,206,868 A | | 4/1993 | Deacon | |
| 5,742,626 A | | 4/1998 | Mead et al. | |
| 5,835,513 A | | 11/1998 | Pieterse et al. | |
| 5,898,717 A | | 4/1999 | Yin | |
| 5,982,788 A | * | 11/1999 | Hemmati ..................... | 372/22 |
| 6,061,370 A | | 5/2000 | Yin | |
| 6,066,127 A | * | 5/2000 | Abe ............................. | 606/2 |

OTHER PUBLICATIONS

J. M. Yarborough, et at, "Enhancement of Optical Second Harmonic Generation by utilizing the Dispersion of Air", vol. 18, No. 3, *Applied Physics* pp. 70–73. Nov. 1970.

* cited by examiner

Primary Examiner—Albert W. Paladini
(74) Attorney, Agent, or Firm—James A. Quinton

(57) ABSTRACT

Harmonic lasers are provided. A third harmonic laser includes a first high reflector and an output coupler forming a resonator cavity having an optical axis. The resonator cavity includes a laser medium for producing a fundamental beam. Desirably, the laser medium is Nd:YAG, Nd:YLF, Nd:YV04, although other laser mediums are also contemplated such as Ti:sapphire, Nd:YAB and the like. The laser medium can be pumped by any desired source for example laser, laser diode, laser diode bar, fiber coupled laser diode bar or lamp which are well known in the art. The laser medium can be either end pumped or side pumped which are also well known. The first high reflector is reflective of a fundamental beam. A second harmonic generator is located within the cavity formed between the first high reflector and the output coupler for generating a second harmonic beam from the fundamental beam. The output coupler is highly transmissive for second harmonic beam and partially transmissive for a fundamental beam. The fundamental beam and the second harmonic beam exit the output coupler before incidenting on a harmonic generator. The third harmonic generator is positioned external to the resonator cavity and is located along the optical path from the output coupler so that the fundamental and the second harmonic beams incident on the third harmonic generator where portions of the second and the fundamental are converted to third harmonic beam.

38 Claims, 2 Drawing Sheets

HARMONIC LASER

TECHNICAL FIELD

The field of the invention concerns harmonic lasers, and in particular a method and apparatus for generating frequency doubled, tripled and higher harmonic laser beams.

BACKGROUND OF THE INVENTION

Optical harmonic generation is well known in the art. Intracavity second harmonic generators are known. See for example J. M. Yarborough, et al, "Enhancement of Optical Second Harmonic Generation by Utilizing the Dispersion of Air", Vol. 18, No. 3., *Applied Physics* p 70–73. Third harmonic generators are also known in the art. Generally third harmonic generation requires the generation of a second harmonic beam. External third harmonic lasers, where a second harmonic nonlinear crystal and a third harmonic nonlinear crystal are located outside the cavity, are known in the art, see for example U.S. Pat. No. 5,835,513. Intracavity third harmonic lasers are also known. See: U.S. Pat. Nos. 5,898,717 and 6,002,695. It is desired to provide improved external third harmonic generation efficiency. Third harmonic generation requires one photon from each of the second harmonic and the fundamental to form a third harmonic photon. One second harmonic photon represents twice as much energy as the fundamental. For optimum third harmonic conversion, about twice as much second harmonic power is required as fundamental power. In prior art external second harmonic generation, that would mean 67% conversion from the fundamental to the second harmonic. With so high conversion efficiency, the fundamental beam intensity can be distorted substantially to prevent efficient third harmonic generation, as well as deteriorated transverse mode quality. There is still a need for more reliable second and third harmonic generators and for improved efficiency in external cavity third harmonic generators.

SUMMARY OF INVENTION

The present invention relates to an improved second harmonic laser. In addition, the invention relates to an improved higher order harmonic laser which provide an externally generated third harmonic beam fourth harmonic or fifth harmonic beam.

According to the invention, a second harmonic laser is provided. The laser includes a first high reflector and an output coupler defining a laser resonator cavity having an optical axis. The resonator cavity includes a laser medium for producing a fundamental beam of electromagnetic radiation. Desirably, the laser medium is Nd;YAG, Nd:YLF, Nd:YV04, although other laser mediums are also contemplated such as Ti:sapphire, Nd:YAB and the like. A second harmonic generator is located within the resonator cavity along the optical axis for generating a second harmonic beam from fundamental beam propagating from and to the laser medium. The first high reflector is reflective of fundamental beam. The output coupler is at least partially reflective of fundamental beam and transmissive, preferably highly transmissive of a second harmonic beam. The second harmonic generator is located between the output coupler and the laser medium, so that fundamental beam propagating from the laser medium makes a first pass through the second harmonic generator where a portion of the fundamental beam is converted to a second harmonic beam. The fundamental beam reflected by the output coupler passes through the second harmonic generator where another portion of the fundamental beam is converted into second harmonic beam. The fundamental and the second harmonic propagate toward the laser medium. A beam separator, desirably a dichroic mirror is located between the second harmonic generator and the laser medium. The dichroic mirror is highly reflective for second harmonic beam and highly transmissive for fundamental beam or highly transmissive for second harmonic beam and highly reflective for fundamental beam for fundamental beam, so that second harmonic beam is separated from the fundamental beam. A second high reflector is located in optical communication with the beam separator desirably to receive second harmonic beam separated by the dichroic mirror and reverse its direction of propagation, so that it will propagate through the second harmonic generator toward the output coupler.

In operation, a second harmonic laser according to the invention is provided. The laser medium is pumped by any desired pumping source such as laser, laser diode(s) or lamp(s). The laser resonator is formed between the high reflector and the output coupler. The fundamental beam propagating from the laser medium is directed through a second harmonic generator where a portion of the fundamental beam is converted to the first second harmonic beam. The fundamental and second harmonic beams propagating from the second harmonic generator are then directed to an output coupler, which is at least partially reflective of fundamental beam and transmissive, preferred highly transmissive of second harmonic beam and directs second harmonic beam outside the cavity. The fundamental beam reflected by the output coupler makes a second pass through the second harmonic generator and a second additional second harmonic beam is produced. The fundamental and second harmonic beams are then directed to a beam separator, desirably a dichroic mirror located between the second harmonic generator and the laser medium. The dichroic mirror is highly reflective for second harmonic beam and highly transmissive for fundamental beam or highly transmissive for second harmonic and highly reflective for fundamental beam. The separated second harmonic beam is then directed to a second high reflector in optical communication with the dichroic mirror to receive second harmonic beam separated by the dichroic mirror. The second high reflector is reflective for second harmonic beam. As a result the direction of propagation of the second harmonic beam produced on the second pass is reversed and second harmonic beam is returned along the optical axis to propagate toward the output coupler. Thus, the second harmonic beam incidents on the dichroic mirror and is directed along the optical axis through the second harmonic generator and then is transmitted through the output coupler. Desirably the two second harmonic beams are in substantially same propagation wave front and overlapping in transverse mode when they are combined.

In another aspect of the invention, a third harmonic laser or higher harmonic is provided. Such a laser includes a first high reflector and an output coupler forming a resonator cavity having an optical axis. The resonator cavity includes a laser medium for producing a fundamental beam. Desirably, the laser medium is Nd:YAG, Nd:YLF, Nd:YV04, although other laser mediums are also contemplated such as Ti:sapphire, Nd:YAB and the like. The laser medium can be pumped by any desired pumping source for example laser, laser diode, laser diode bar, fiber coupled laser diode bar or lamp which are well known in the art. The laser medium can be either end pumped or side pumped which are also well known. The first high reflector is reflective of a fundamental beam. A second harmonic generator is located within the cavity formed between the first high reflector and the output coupler for generating a second harmonic beam from the fundamental beam. The output coupler is highly transmissive for second harmonic beam and partially transmissive for a fundamental beam. Desirably the second harmonic and fundamental are provided in a predetermined power ratio most desirably about 2:1 second harmonic to fundamental. A third harmonic generator is positioned external to the resonator cavity and is located along the optical path from the output coupler, so that the fundamental and the second harmonic beams incident on the third harmonic generator where portions of the second and the fundamental are converted to third harmonic beam.

In another embodiment of the invention, the second harmonic generator is located between the output coupler and the laser medium, so that fundamental beam makes a first and second pass through the second harmonic generator. A beam separator desirably a dichoric mirror is located between the second harmonic generator and the laser medium, to reverse the direction of the propagation of the second harmonic beam generated on the second pass of the fundamental beam through the second harmonic generator, so that the second harmonic beam propagates along the optical axis toward the output coupler where it combines with the first second harmonic beam and is transmitted outside of the cavity and incident on the third harmonic generator.

In another aspect of the invention fourth and fifth harmonic lasers are provided. In the third harmonic generator, not all of the fundamental (1w) and second harmonic (2w) beams are converted to third harmonic (3w). Thus, along with the third harmonic beam, substantial amounts of fundamental and second harmonic beam are propagating from the third harmonic generator.

In the fourth harmonic laser, the third harmonic laser described above is provided. A fourth harmonic generator is located external to the resonator optical cavity in optical communication with the beams propagating from the third harmonic generator. The fourth harmonic generator is desirably a nonlinear crystal cut for fourth harmonic generation 1w+3w.

In operation the third harmonic laser is operated. The beams propagating from the third harmonic generator, desirable the fundamental beam 1w and third harmonic beam 3w are directed through to fourth harmonic generator where a portion of the 1w and 3w beams are converted to fourth harmonic beam (4w).

In the fifth harmonic laser, the third harmonic laser described above is provided. A fifth harmonic generator is located external to the resonator cavity in optical communication with the beams propagating from the third harmonic generator. Desirably the fifth harmonic generator is a fifth harmonic nonlinear crystal cut for fifth harmonic generation 2w and 3w. In operation a third harmonic laser is operated as described above. The second harmonic and third harmonic beams propagating from the third harmonic generator are directed through the fifth harmonic nonlinear generator for conversion of second harmonic (2w) and third harmonic (3w) to fifth harmonic beam (5w).

It is an object of the invention to provide an efficient intracavity second harmonic laser.

It is an object of the invention to provide an efficient external cavity third harmonic generation laser.

It is an object of the invention to provide an efficient method to generate a predetermined power ratio of the second harmonic and the fundamental in substantially the same propagation direction and having substantially overlapping transverse mode.

It is an object of the invention to provide an efficient method to generate second harmonic and fundamental in a power ratio of 2:1 in substantially the same propagation direction and substantially overlapping transverse mode.

It is an object of the invention to provide efficient external third harmonic generation with improved transverse mode.

It is an object of the invention to provide efficient external cavity third harmonic generation laser with a second harmonic generator located in the laser cavity and a third harmonic generator located external to the cavity.

It is an object of the invention to provide an efficient external cavity fourth or fifth harmonic generation laser with a second harmonic generator located in the laser cavity.

It is an object of the invention to provide an efficient external cavity third harmonic generation laser with a second harmonic generator located in the laser cavity and a third harmonic generator located external to the cavity and a LBO nonlinear crystal as the third harmonic generator.

It is an object of the invention to provide efficient external cavity third harmonic generation laser with a second harmonic generator located in the laser cavity and a third harmonic generator located external to the cavity and a LBO nonlinear crystal as the third harmonic generator oriented to partially compensate for the walk off generated from a CPM second harmonic generator.

Other and further objects will become apparent from the appended specification drawing and claims. It should be understood that there are numerous embodiments contemplated by the subject invention. Every embodiment of the invention does not necessarily achieve every object of the invention.

The preferred embodiment of the present invention is illustrated in the drawings and examples. However, it should be expressly understood that the present invention should not be limited solely to the illustrative embodiment.

DETAILED DESCRIPTION OF THE INVENTION

Figure 1:
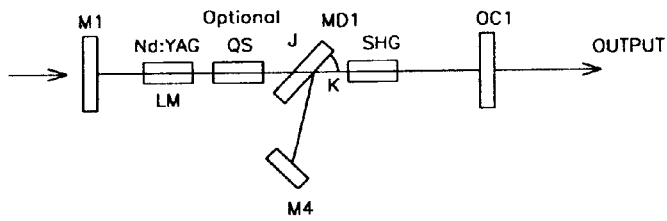
FIG. 1 is a diagrammatic view of a laser according to the invention.

The present invention relates to an improved second harmonic laser. In addition, the invention relates to an improved third harmonic laser which provides an externally generated third harmonic beam having high conversion efficiency of fundamental beam to third harmonic beam. The invention also related to improved fourth and fifth harmonic lasers.

According to the invention, a two pass second harmonic laser is provided. The laser includes a first high reflector and an output coupler defining a laser resonator cavity having an optical axis. Preferably the first high reflector is a high reflecting mirror or a surface coated with a high reflecting coating for fundamental beam. The resonator cavity includes a laser medium for producing a fundamental beam of electromagnetic radiation. Desirably, the laser medium is Nd:YAG, Nd:YLF, Nd:YV04, although other laser media are also contemplated. The laser medium can be pumped by laser, laser diode, laser diode bar, fiber coupled laser diode bar or lamp which are well known in the art. The laser medium can be either end pumped or side pumped which are also know in the art.

A second harmonic generator is located within the resonator cavity along the optical axis for generating a second harmonic beam from fundamental beam propagating from and to the laser medium. The first high reflector is reflective of fundamental beam. The output coupler is at least partially reflective of fundamental beam and transmissive, preferably highly transmissive of a second harmonic beam. Optionally the output coupler is also partially transmissive for fundamental beam. The opposite optical side of output coupler can be antireflection coated with minimum reflection of the fundamental and second harmonic beams. Desirably the output coupler is about 1% to about 25% transmissive for fundamental beam, preferably about 3 to 10% transmissive for a continuous pumping source, 5 to 70%, preferably 5 to 40% when the pumping source is pulsed where gain is much higher than CW pumping. The percentage of transmission of fundamental is preferably selected to provide preselected power ratio of the second harmonic to the fundamental. The second harmonic generator is located between the output coupler and the laser medium, so that fundamental beam propagating from and to the laser medium makes a first pass, and second pass through the second harmonic generator, where a portion of the fundamental beam is converted to a second harmonic beam on each pass. The second harmonic generator is desirably a second harmonic nonlinear crystal. Examples of suitable crystals include $LiNbo_3$, $BaNa(NbO_3)$, $LiO_3$, KDP, $KTiOPO_4$, $CsLiB_6O_{10}$, BBO and LBO. Optionally, other nonlinear generators can be used, for example periodically poled $LiNbO_3$(PPLN) or periodically poled glass fibers(PPGF).

Desirably the second harmonic generator is a nonlinear crystal such as LBO or BBO or KTP or CLBO or other suitable second harmonic generation nonlinear medium. The second harmonic generator desirably a crystal can be critically phase matched (CPM) or non-critical phase matched (NCPM). LBO nonlinear crystal is useful in the subject invention. The LBO crystal can be cut for noncritical phase match (NCPM) where there is substantially no walk off between the fundamental and second harmonic beams, or critical phase match (CPM) where there is walk off between the fundamental and the second harmonic beams. Depending on the particular circumstance, one of these two or both can be used to generate the second harmonic. In general, if the laser beam spot size is substantially larger than the walk off, then either approach can be used (CPM or NCPM), if the laser beam spot size is comparable in size as compared with the walk off displacement, then, NCPM method is preferred. Walk off is proportional to the nonlinear crystal length, and second harmonic conversion efficiency is directly related with the peak power density of the fundamental beam and the effective interaction length of the crystal. Thus, in low peak power situations, NCPM method is favored.

A beam separator, desirably a dichroic mirror is located between the second harmonic generator and the laser medium, to separate second harmonic from fundamental. The dichroic mirror is highly reflective for second harmonic beam and highly transmissive for fundamental beam, or vise versa. A second high reflector is located in optical communication with the beam separator desirably the dichroic mirror to receive second harmonic beam propagating from the dichroic mirror and reverse its direction of propagation, so that it will propagate toward the output coupler. The location and curvature of the second high reflector is chosen so that the reflected second harmonic beam matches the second harmonic beam generated when the fundamental beam passes through the second harmonic generator from the laser medium propagating toward the output coupler in transverse mode and propagation wavefront. These parameters can be approximately determined by ABCD matrix law, $R_0=2\times B/(D-A)$, $\pi\omega^2/\lambda=B/(1-(A+D)^2/4)^{1/2}$, where A, B, C, D are components of ABCD matrix, $R_0$ is the phase curvature of the second harmonic beam just before the output coupler which is the curvature of the output coupler, $\omega$ is the radius of the second harmonic beam spot size at the output coupler. For instance, in one case, $A=1-2d/R$, $B=2d-2d2/R$, $C=-2/R$, $D=1-2d/R$ where R is the curvature of the second high reflector mirror for the second harmonic, d is the distance from the output coupler to that reflector. One of the example is the phase curvature of the output coupler is flat which means $R_0$ equals to 0. Then R=d as well known in the art.

For low number of longitudinal modes or single longitudinal mode fundamental laser, the position of the second reflector, in addition to above considerations, should be adjusted so that the two second harmonic beams generated will be in phase when they exit the second harmonic generator. The fundamental beam is separated from the second harmonic by the dichroic mirror and directed to the laser medium for amplification. Optionally, acoustic-optic, electro-optic Q-switch or other Q-switch device can be provided in the cavity to provide pulsed operation.

In operation, the fundamental beam propagating from the laser is directed through a second harmonic generator, preferably a nonlinear crystal cut for CPM or NCPM where a portion of the fundamental beam is converted to a first second harmonic beam. The fundamental and second harmonic beams propagating from the second harmonic generator are then directed to an output coupler, which is at least partially reflective of fundamental beam and transmissive of second harmonic beam and directs second harmonic beam outside the cavity. The fundamental beam reflected by the output coupler makes a second pass through the second harmonic generator and a second additional second harmonic beam is produced. The fundamental and second harmonic beams are then directed to a beam separator, desirably a dichroic mirror located between the second harmonic generator and the laser medium. The dichroic mirror is highly reflective for second harmonic beam and highly transmissive for fundamental beam, or vise versa to separate fundamental and second harmonic beams. The second harmonic beam is then directed to a second high reflector located along the second harmonic optical axis in optical communication with the dichoric mirror to receive second harmonic beam propagating from the dichroic mirror. The second high reflector is reflective for second harmonic beam. The curvature and position of the second high reflector is preferably chosen so that reflected second harmonic beam matches the first second harmonic beam generated when the fundamental passes through the second harmonic generator toward the output coupler in transverse mode and in substantially same propagation wave front. Mismatched second harmonic beams may be used if the application can tolerate a reduced efficiency of conversion. As a result the direction of propagation of the second harmonic beam produced on the second pass is reversed and second harmonic beam is returned along the optical axis to propagate toward the output coupler. Thus, the second harmonic beam incidents on the dichroric mirror and is directed along the optical axis through the second harmonic generator and then is transmitted through the output coupler. Desirably the two second harmonic beams are substantially the same in propagation wavefront and substantially the same in transverse mode when they are combined.

In another aspect of the invention, a third harmonic laser is provided. Such a laser includes a first high reflector desirably a high reflecting mirror or optionally a coated surface and an output coupler forming a resonator cavity having an optical axis. The resonator cavity includes a laser medium as described above for producing a fundamental beam. The first high reflector is reflective of a fundamental beam. A second harmonic generator is located within the cavity formed between the first high reflector and the output coupler for generating a second harmonic beam from the fundamental beam. The output coupler is highly transmissive for second harmonic beam and partially transmissive and partially reflective for a fundamental beam. Desirably the output coupler is about 1% to about 25% preferably about 2 to 10% transmissive for fundamental beam. The percentage of transmission of the output coupler is selected to provide the preselected power ratio of the second harmonic to the fundamental preferably a power ratio of about 2:1. The fundamental beam and the second harmonic beam exit the output coupler preferably in a power ratio of second harmonic to fundamental of about 2:1. A third harmonic generator is positioned external to the resonator cavity and is located along the optical beam path from the output coupler, so that the fundamental and second harmonic beam, both incident on the third harmonic generator and in part are converted to third harmonic beam. Desirably a beam focus system containing one or more lenses, mirrors or prisms focuses the beams exiting from the output coupler prior to their incidenting on the third harmonic generator.

In another embodiment of the invention, a third harmonic laser is provided having a double pass second harmonic laser according to the invention as described above. See FIGS. 1 and 2. A second harmonic generator is located between the output coupler and the laser medium, so that fundamental beam makes a first and second pass through the second harmonic generator as described in detail above to form two second harmonic beams. A beam separator, preferably a dichoric mirror, is located between the second harmonic generator and the laser medium, to reverse the direction of the propagation of the second harmonic beam generated on the second pass of the fundamental beam through the second harmonic generator, so that the second harmonic beam propagates along the optical axis toward the output coupler, preferably having substantially the same spot size and beam propagation wave front as the first second harmonic beam. The beams are transmitted by the output coupler for incidenting on the external third harmonic generator. The third harmonic generator according to invention is desirably a third harmonic nonlinear crystal for example LBO, BBO, or CLBO. Optionally, other nonlinear generators can be used. Desirably the third harmonic generator for example a nonlinear crystal such as LBO has been oriented to at least partially compensate for walkoff when a CPM second harmonic crystal is used in the second harmonic generation.

In another aspect of the invention fourth and fifth harmonic lasers are provided. In the third harmonic generator, not all of the fundamental (1w) and second harmonic (2w) beams are converted to third harmonic (3w). Thus, along with the third harmonic beam, substantial amounts of fundamental and second harmonic beam are propagating from the third harmonic generator.

In the fourth harmonic laser, the third harmonic laser described above is provided. A fourth harmonic generator is located external to the resonator optical cavity in optical communication with the beams propagating from the third harmonic generator. The fourth harmonic generator is desirably a nonlinear crystal cut for fourth harmonic generation 1w+3w.

Preferably, a LBO crystal, optionally a KDP, BBO, CLBO and KD*P crystal cut for fourth harmonic generation 1w+3w can also be used.

In operation the third harmonic laser is operated. The beams propagating from the third harmonic generator, desirable the fundamental beam 1w and third harmonic beam 3w are directed through fourth harmonic generator where a portion of the 1w and 3w beams are converted to fourth harmonic beam (4w).

In prior art devices, the fourth harmonic generation is often achieved using a BBO crystal cut for 2w+2w. However, it is desirable to use a LBO crystal which has a larger acceptance angle and less UV absorption at 266 mm. However, the LBO crystal is only available in 1w+3w. Thus according to the invention an external fourth harmonic generation laser is provided using a LBO crystal as the fourth harmonic generator.

In the fifth harmonic laser, the third harmonic described above is provided. A fifth harmonic generator is located external to the resonator cavity in optical communication with the beams propagating from the third harmonic generator. Desirably, the fifth harmonic generator is fifth harmonic nonlinear crystal cut for fifth harmonic generation 2w+3w for example a BBO crystal. In operation a third harmonic laser is operated as described above. The second harmonic and third harmonic beam propagating from the third harmonic generator are directed through the fifth harmonic nonlinear generator for conversion of second harmonic (2w) and third harmonic (3w) to fifth harmonic beam (5w).

The lasers according to the invention can be end pumped from one or both ends, or side pumped. Diode pumping is desirably used. Alternatively lamp pumping or other alternative pumping devices are contemplated.

Referring to FIG. 1, a two pass second harmonic laser according to the invention is provided. A laser resonator cavity is formed between a first high reflector desirably mirror M1 and an output coupler OC1. A laser medium is provided between mirror M1 and output coupler OC1. Desirably, the laser medium LM is a laser crystal, desirably a Nd:YAG, Nd:YLF, or Nd:YV04 crystal. An optical axis is formed between mirror M1 and output coupler OC1. Within the resonator cavity, along the optical axis, a second harmonic generator SHG, desirably for example a LBO crystal optionally a BBO or KTP crystal or other suitable nonlinear generator for second harmonic generation is provided. Within the resonator cavity, a beam separator preferably a dichroic mirror MD1 is provided along the optical axis between the second harmonic generator SHG and the laser medium LM to separate second harmonic from fundamental beam. Dichroic mirror MD1 is highly transmissive for fundamental beam on both sides J and K and is highly reflective for second harmonic beam on side K. Desirably MD1 is oriented at about brewster angle where J of MD1 does not need to be antireflection coated for the fundamental wavelength and acts like polarization discrimination components (polarizer). As a result, the laser produces substantially "P" polarized fundamental beam referring to MD1. Mirror M4 which is reflective preferably highly reflective for second harmonic bean is provided in optical communication with side K of Mirror MD1. Mirror M1 is highly reflective for fundamental beam which in the case of Nd:YAG laser medium is 1064 nm. Output coupler OC1 is at least partially reflective for fundamental beam and highly transmissive for second harmonic beam. The exit optical side of the output coupler OC1, is antireflection coated for both fundamental and second harmonic as is well known in the art. In the case of a Nd:YAG laser, the frequency of the second harmonic beam would be 532 nm. Optionally, a Q-switch QS can be placed in the cavity to provide pulsed operation.

In operation, the laser medium LM is excited by a pumping source for example a diode or lamp pump. The laser medium can be end pumped or side pumped as desired. The fundamental beam propagating from the lasing medium LM passes through Mirror MD1, which is highly transmissive of "P" polarized fundamental beam, and incidences upon second harmonic generator SHG, where a portion of the fundamental beam is converted to second harmonic beam. The second harmonic beam produced is transmitted through output coupler OC1 outside the cavity. Fundamental beam is then reflected for a second pass through the second harmonic generator. A portion of the fundamental beam is converted to additional second harmonic beam. Fundamental beam and second harmonic beam incident on dichroic mirror MD1 which is highly reflective for second harmonic frequency on side K and highly transmissive for fundamental frequency on side K and J. Second harmonic beam is reflected by mirror MD1 to mirror M4, which is highly reflective for second harmonic frequency. The second harmonic beam is then reflected by mirror M4, back to dichroic mirror MD1, where it is reflected along the optical axis and then passes again through the second harmonic generator. The second harmonic beam is then transmitted outside the cavity through output coupler OC1. The fundamental beam that is unconverted to second harmonic is transmitted by dichroic mirror MD1 to laser medium LM for amplification. The position and curvature M4 are chosen so that reflected second harmonic beam has substantial same beam spot size and transmission wavefront as the first pass second harmonic beam when both of them are combined.

Figure 2:
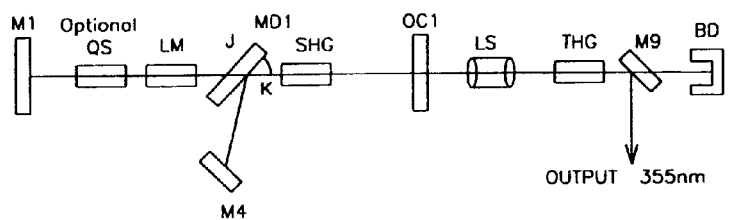
FIG. 2 is a diagrammatic view of a laser according to the invention.

Referring to FIG. 2, a third harmonic laser is provided. A laser resonator cavity is formed between mirror M1 and output coupler OC1. A laser medium is located between mirror M1 and output coupler OC1. Desirably, the laser medium LM is a laser crystal, desirably a Nd:YAG, Nd:YLF, Nd:YV04 crystal. An optical axis is formed between mirror M1 and output coupler OC1. Within the resonator cavity along the optical axis, a second harmonic generator SHG, desirably a nonlinear crystal, for example a LBO crystal optionally a BBO crystal or other suitable nonlinear generator for second harmonic generation is provided. Within the resonator cavity, a beam separator preferably a dichroic mirror MD1 is located between the second harmonic generator SHG and the lasing medium LM. Dichroic mirror MD1 is highly transmissive for fundamental frequency on both sides J and K and is highly reflective for second harmonic frequency on side K. An optical Q-switch QS is provided within the cavity.

Mirror M4 which is reflective preferably highly reflective, for second harmonic beam is provided in optical communication with reflected beam from side K of Mirror MD1. Mirror M1 is highly reflective for fundamental beam in the case of Nd:YAG laser, fundamental beam at 1064 nm. Output coupler OC1 is partially reflective for fundamental beam and highly transmissive for second harmonic beam, and partially transmissive for fundamental beam. In the case of a Nd:YAG laser, the second harmonic beam frequency would be 532 nm.

In operation, the laser medium LM is excited by a pumping source for example a diode, or a lamp. The laser medium can be end pumped or side pumped as desired. The fundamental beam propagating from the laser medium LM passes through Mirror MD1, which is highly transmissive of fundamental beam, and incidences upon second harmonic generator SHG, where a portion of the fundamental beam is converted to second harmonic beam. The second harmonic beam produced is transmitted through output coupler OC1. Fundamental beam is partially reflected by output coupler OC1 for a second pass through the second harmonic generator where additional fundamental beam is converted to second harmonic. A portion of the fundamental beam desirably 1 to 25% preferably about 2 to 10% of the fundamental beam is transmitted through output coupler Mirror MD1 is highly reflective for second harmonic on side K and highly transmissive for fundamental beam on side K and J. Second harmonic beam is reflected by mirror MD1 to mirror M4, which is highly reflective for second harmonic beam. The position and curvature M4 are chosen so that reflected second harmonic beam has substantial same beam spot size and transmission wavefront as the first pass second harmonic beam when both of them are combined. The second harmonic beam is then reflected by mirror M4, back to mirror MD1, where it is reflected along the resonator optical axis toward output coupler OC1 and passes again through the second harmonic generator. The second harmonic beam is directed to output coupler OC1 where it combines with the first second harmonic beam and exits the output coupler OC1 as the output. The fundamental beam that is unconverted to second harmonic beam is transmitted by dichroic mirror MD1 and is directed through laser medium LM for amplification.

Propagating through output coupler OC1 are fundamental and second harmonic beams, preferably in a 2 to 1 power ratio between the second and the fundamental beams. The beams are directed to a focus system LS, which focuses the beams into the third harmonic generator. Desirably, the focus system consist of one or more lenses (or mirrors). The fundamental and second harmonic beam exiting the focus system are then directed to third harmonic generator THG which is located external to the resonator cavity in optical communication with beam propagating from output coupler OC1. Desirably the third harmonic generator is a third harmonic nonlinear crystal, which produces third harmonic beam from the fundamental and the second harmonic. When both the second harmonic and the fundamental incidence upon the third harmonic generator, a portion of the fundamental and second harmonic beams are converted to third harmonic beam. Desirably a mirror M5 is provided along the optical axis of the third harmonic generator THG. Mirror M5 is a dichroic mirror which separates third harmonic beam from input beams. Optionally, a dispersion prism or other beam separation device can be used.

Figure 3:
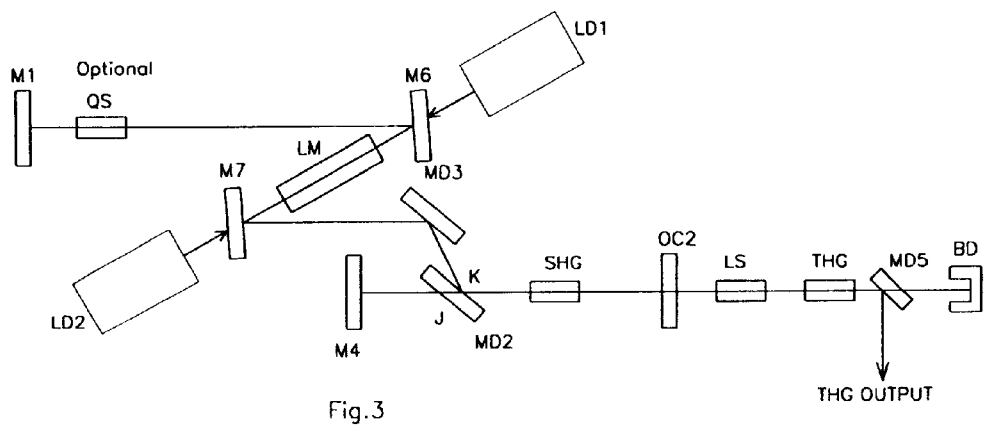
FIG. 3 is a diagrammatic view of a laser according to the invention.

As best seen in FIG. 3, a third harmonic laser according to the invention is provided. In FIG. 3, a double side diode end pumped laser is provided. As shown in FIG. 3 a laser cavity is provided between Mirror M11 and output coupler OC2, The laser medium LM is located between two folding Mirrors M6 and M7. Mirrors M6 and M7 are highly reflective for fundamental beam and highly transmissive for pumping beam supplied by laser diodes LD1 and LD2, which are located adjacent to Mirrors M6 and M7. Opposite sides of mirror M6 and M7 are antireflection coated for minimum reflection for pumping wavelength, as well known in the art. Optional Q-switch QS can be inserted in the cavity to provide pulsed operation. A second harmonic, desirably an LBO or BBO crystal SHG, generator is located within the resonator cavity, desirably adjacent output coupler OC2. A beam separator, preferably dichroic mirror MD2 along the optical axis located between second harmonic and laser medium. MD2 is desirably highly reflective in the fundamental for "S" polarization and highly transmissive for the second harmonic "P" polarization. Preferably MD2 is oriented at about brewster angle for maximum transmission at the second harmonic beam on the side J of MD2.

Dichroic mirror MD3 is located within the resonator cavity between the laser medium LM and mirror MD2 in optical communication with reflected fundamental beam from mirror MD2. MD3 is highly reflective for the fundamental beam, optionally highly reflective for "S" polarization of the fundamental beam and somewhat or highly transmissive for "P" polarization of the fundamental beam. Optionally other polarization discrimination device can be inserted in the cavity to produce polarized fundamental beam. Second harmonic generator is located between output coupler OC2 and beam separator MD2. Output coupler OC2 is highly transmissive for the second harmonic beam and partially transmissive for the fundamental with transmission of 1 to 25%, preferably 2 to 10% when the pumping source is continuous (CW), 5 to 70%, preferably 10 to 50% when the pumping source is pulsed. Exit optical side of OC2 is antireflection coated for both fundamental and the second harmonic beam. In optical communication with the beams propagating from output coupler OC2 is third harmonic generation THG preferably a LBO or BBO nonlinear crystal. Beam shaping optics LS are located between the third harmonic generator and the output coupler OC2. Beam focus optics LS can be lens or lenses, mirrors or prisms which produces optimal beam size to the third harmonic crystal THG to produce third harmonic output. A beam separator desirably is a dichroic mirror MD5 is located adjacent to the output end of THG. MD5 is highly reflective for third harmonic which separate the third harmonic output from the fundamental and the second harmonic. A beam dump is desirably provided on communication block unwanted the fundamental and the second harmonic.

In operation, the laser medium is end pumped by both laser diodes LD1 and LD2 2. The fundamental beam propagating from laser medium LM is reflected by Mirror M6 and directed to Mirror M11, where it is reflected back along the optical axis, and is reflected by Mirror M6 through the laser Medium. Fundamental beam is reflected by Mirror M7, along the optical axis, where it incidence on Mirror MD2 through reflection from MD3. Desirably MD3 is a polarization discriminator which reflects "S" polarization and somewhat transmits "P" polarization of the fundamental beam. MD2 is highly reflective for fundamental and highly transmissive for second harmonic. The fundamental reflected by the MD2 passes through the second harmonic generator SHG where a portion of the fundamental is converted to a first second harmonic beam. The first second harmonic and the fundamental incident on the output coupler OC2 where the second harmonic and a portion, preferably 1 to 25%, more preferably 2 to 10%, are transmitted through the output coupler OC2 as the output. The remaining fundamental is reflected back through SHG where another portion of the fundamental is converted to a second harmonic beam. The second harmonic and the remaining fundamental exiting from SHG incident on MD2 where the fundamental is separated from the second harmonic. Fundamental is reflected by MD2 to MD3 where it is reflected to mirror M7. Fundamental is reflected by M7 to LM for amplification. Second harmonic is transmitted by mirror MD2 to mirror M41 which is highly reflective for second harmonic. M41 reverses the propagation direction of the second harmonic beam and directs it through MD2, SHG and OC2 as the output where it combines with the first second harmonic beam. The position and curvature M41 are chosen so that reflected second harmonic beam has substantially the same beam spot size and propagation wavefront as the first second harmonic beam when both of them are combined. The output of the fundamental and combined second harmonic beams incident on the third harmonic generator through beam shaping optics LS. LS can be one or more lenses or mirrors or prisms or any other beam shaping optics to optimize the third harmonic conversion. An optional beam dump BD is provided in optical communication with beams transmitted by Mirror MD5, which in this instance would be fundamental and second harmonic beam. The resulting laser is superior to prior art external third harmonic generation lasers. For example, the laser shown in FIG. 4 is a prior art device.

Figure 4:
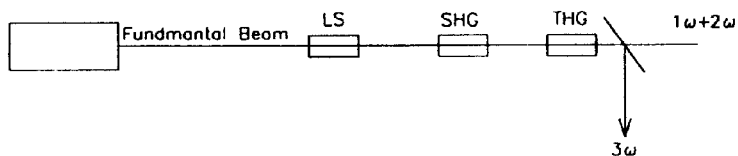
FIG. 4 is a diagrammatic view of a prior art laser.

In FIG. 4 a prior art third harmonic laser is shown In such a prior art device, a fundamental beam is provided from a standard laser. It is directed through a focus system, where it incidence on a second harmonic generator, where a portion of the fundamental beam is converted to second harmonic. The second harmonic and fundamental beam are then directed to a third harmonic generator, where a portion of the two beams are converted to third harmonic. A separating mirror is then provided, which is highly reflective to third harmonic, to separate the third harmonic and direct it as the output of the laser.

Figure 5:
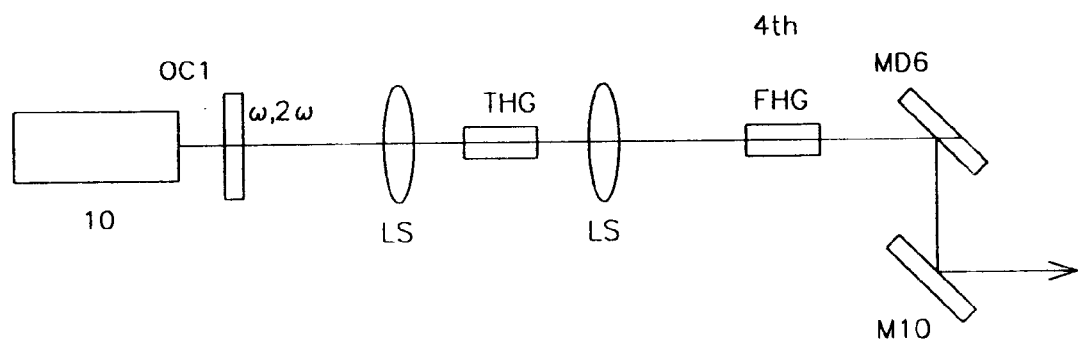
FIG. 5 is a diagrammatic view of a laser according to the invention.

Referring to FIG. 5, a fourth harmonic laser according to the invention is provided. A second harmonic laser 10 is provided to generate a second harmonic beam in the cavity such as supplied through output coupler OC1 as described with regard to FIG. 2 above. As in FIG. 2, the propagating from output coupler OC1, are fundamental and second harmonic beams, preferably in about a 2 to 1 power ratio between second harmonic and fundamental beam. The beams are directed to focus system LS which focuses the beams into the third harmonic generator THG. Desirably the focus system consists of one or more lenses or prisms or mirrors. A third harmonic generator is located external to the laser cavity of the second harmonic laser 10. Again as described with regard to FIG. 2, the fundamental and second harmonic beams are directed to the third harmonic generator which is in an optical communication with the beams propagating from the output coupler OC1. Desirably, the third harmonic generator is a LBO third harmonic generation crystal or optionally a BBO third harmonic generation crystal or other suitable third harmonic generator.

Propagating from the third harmonic generator are fundamental second and third harmonic beams. The fundamental and third harmonic beams are desirably passed through a beam shaping optics system LS1 which focus the beams into the fourth harmonic generator. The fourth harmonic generator is desirably a nonlinear crystal for generation of fourth harmonic beam from fundamental and third harmonic beam. Preferably, a LBO nonlinear crystal is used. The LBO nonlinear crystal for 1w+3w generation of fourth harmonic beam is particularly desirable because it has a large acceptance angle and has a low UV absorption at 266 nm compared with BBO crystal. Optionally, a BBO nonlinear crystal or other nonlinear crystal for generation of fourth harmonic from 1w+3w can be used. Other optional nonlinear crystals include KDP, CLBO and KD*P. Propagating from the fourth harmonic generator will be fundamental, second, third and fourth harmonic beams. These beams will be directed to a beam separator, desirably dichroic mirror MD6 which is highly reflective for fourth harmonic beams. The reflected fourth harmonic beam is optionally directed to a reflecting mirror M10 which is also highly reflective for fourth harmonic beam and directed as the output of the fourth harmonic laser.

Figure 6:
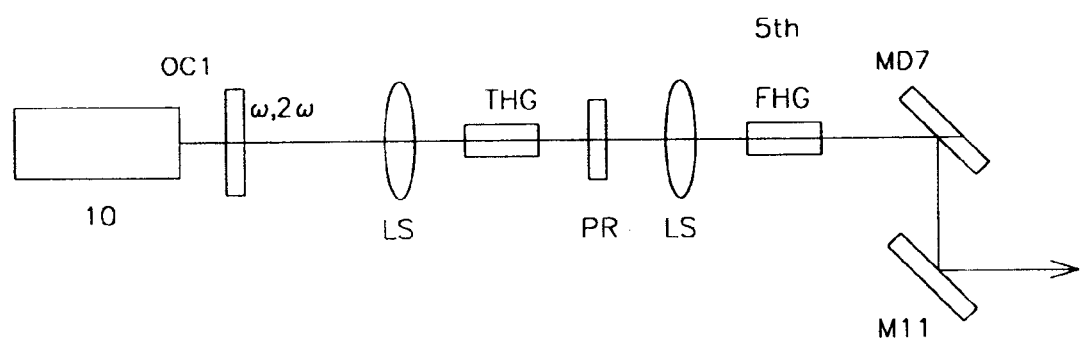
FIG. 6 is a diagrammatic view of a laser according to the invention.

Referring to FIG. 6, a fifth harmonic laser according to the invention is provided. The output of the third harmonic generator THG is directed to a polarization rotator to adjust the relative polarization of the second harmonic and third harmonic beams. The beams are then passed through optics system LS2 where the beams are focused prior to being directed through the fifth harmonic generator. The fifth harmonic generator is provided in optical communication with the beams propagating from the third harmonic generator. The fifth harmonic generator is desirably a nonlinear crystal. For example, a BBO nonlinear crystal cut for a fifth harmonic generation, 2w+3w. The second and third harmonic beams are then directed across the fifth harmonic generator preferably in parallel polarization. A polarization rotator PR is desirably provided between the third harmonic generator and the fifth harmonic generator to rotate the polarization of the second or third harmonic beams so that they are parallel to one another. Propagating from the fifth harmonic generator are fundamental, second, third and fifth harmonic beams which are directed to a beam separator desirably dichroic mirror MD7 which is highly reflective for fifth harmonic. Optionally, the reflected fifth harmonic beams are directed to high reflecting mirror M11 which is highly reflective for fifth harmonic beam and directs the beams reflected by mirror M11 as the output of the laser. Optionally, the laser output can be taken directly from mirror MD7.

The foregoing is considered as illustrative only to the principals of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

What is claimed is:

1. A harmonic laser comprising
   a) a first high reflector and an output coupler forming a resonator cavity having an optical axis; said resonator cavity including a laser medium for producing a fundamental beam; said first high reflector reflective of fundamental beam;
   b) a second harmonic generator located within said resonator cavity generating a second harmonic beam from said fundamental beam;
   c) said output coupler partially reflective and partially transmissive of fundamental beam and transmissive of second harmonic beam;
   d) said second harmonic generator located between said output coupler and said laser medium so that fundamental beam (i) makes a first pass through said second harmonic generator, (ii) is partially reflected by said output coupler and (iii) makes a second pass across said second harmonic generator;
   e) a beam separator located between said harmonic generator and said laser medium, said beam separator separating second harmonic beam from fundamental beam;
   f) a second high reflector located in optical communication with said beam separator to receive said second harmonic beam from said beam separator; said second high reflector reflective for second harmonic beam so that second harmonic beam propagating from said second harmonic generator formed on said second pass of said fundamental beam is reflected back along said optical axis to said output coupler for transmission outside said cavity.

2. The laser according to claim 1 wherein said beam separator is a dichroic mirror located between said second harmonic generator and said laser medium, said dichroic mirror highly reflective for second harmonic beam and highly transmissive for fundamental beam; or said dichroic mirror highly reflective for fundamental beam and highly transmissive for second harmonic beam.

3. The laser according to claim 2 wherein said second high reflector has a curvature and location such that the beam spot size and beam propagation wave front of the separated second harmonic beam are substantially the same as the second harmonic beam produced on said first pass of said fundamental beam.

4. The laser according to claim 2 wherein said output coupler is partially transmissive for fundamental beam.

5. The laser according to claim 4 further comprising a predetermined power ratio between the second harmonic beam and the fundamental beam transmitted by said output coupler.

6. The laser according to claim 5 wherein the predetermined power ratio is about 2:1.

7. The laser according to claim 6 where said second harmonic generator is a second harmonic nonlinear crystal.

8. The laser according to claim 7 wherein said second harmonic nonlinear crystal is selected from the group of LBO, BBO, KTP and CLBO crystals.

9. The laser according to claim 7 wherein said second harmonic nonlinear crystal is a crystal cut for critical phase matching.

10. The laser according to claim 9 wherein said nonlinear crystal is a LBO crystal.

11. The laser according to claim 7 wherein said nonlinear crystal is a LBO crystal.

12. The laser according to claim 11 wherein said nonlinear crystal is cut for noncritical phase matching.

13. A laser for delivering third harmonic beam comprising:
   a first high reflector and an output coupler forming a resonator cavity having an optical axis, said resonator cavity including a laser medium for producing a fundamental beam; said first high reflector reflective of fundamental beam;
   a second harmonic generator located within said cavity for generating a second harmonic beam from said fundamental beam;
   said output coupler highly transmissive for second harmonic beam and partially transmissive for fundamental beam;
   said fundamental beam and said second harmonic beam exiting said output coupler along a optical beam path;
   a third harmonic generator positioned external to the resonator cavity and located along the optical beam path from said output coupler so that said fundamental and second harmonic beams are converted to third harmonic beam.

14. The laser according to claim 13 further comprising:
   said second harmonic generator located between said output coupler and said laser medium so that fundamental beam makes a first and second pass through said second harmonic generator;

a beam separator located between said second harmonic generator and said laser medium separating said second harmonic beam from said fundamental beam;

a second harmonic reflector in optical communication with second harmonic beam separated by said beam separator to reverse the direction of propagation of second harmonic beam generated on the second pass of said fundamental beam so that said second harmonic beam produced on said second pass propagates along the optical axis toward said output coupler.

15. The laser according to claim 14 wherein said beam separator is a dichroic mirror located between said second harmonic generator and said laser medium, said dichroic mirror a) highly reflective for second harmonic beam and highly transmissive for fundamental beam; or b) highly reflective for fundamental beam and highly transmissive for second harmonic beam.

16. The laser according to claim 14 wherein said high reflectors are mirrors.

17. The laser according to claim 14 further comprising a q-switch.

18. The laser according to claim 14 wherein said laser medium is end pumped.

19. The laser according to claim 14 wherein said laser medium is end pumped from both ends.

20. The laser according to claim 14 wherein said third harmonic generator is a nonlinear crystal.

21. The laser according to claim 20 wherein said third harmonic nonlinear crystal is LBO, BBO, or CLBO.

22. The laser according to claim 21 wherein said third harmonic crystal is oriented to at least partially compensate for walk off generated from the second harmonic generator.

23. The laser according to claim 14 further comprising a focus optics system located outside of the laser cavity and said third harmonic generator to focus said beams propagating from said output coupler prior to said beams incidenting on said third harmonic generator.

24. The laser according to anyone of claims 13, 14 or 22 further comprising;

a fourth harmonic nonlinear crystal cut for generation of fourth harmonic beam 1w+3w in optical communication with beams propagating from said third harmonic generator.

25. A laser according to claim 24 further comprising a beam separator to separate said fourth harmonic beam as the laser output.

26. The laser according to claim 24 further comprising said fourth harmonic nonlinear crystal is a LBO crystal.

27. The laser according to anyone of claims 13, 14 or 22 further comprising;

a fifth harmonic nonlinear crystal cut for generation of fifth harmonic beam 2w+3w in optical communication with beams propagating from said third harmonic generator.

28. A laser according to claim 27 further comprising a beam separator to separate said fifth harmonic beam as the laser output.

29. The laser according to claim 13 where said second high reflector has a curvature and location such that the beam spot size and beam propagation wave front of the reflected second harmonic beam are substantially the same as the second harmonic beam produced on said first pass of said fundamental beam through said second harmonic generator.

30. The laser according to claim 13 further comprising a predetermined power ratio between the second harmonic beam and the fundamental beam transmitted by said output coupler.

31. The laser according to claim 30 wherein the predetermined power of ratio is about 2:1.

32. The laser according to claim 31 wherein said second harmonic generator is a second harmonic nonlinear crystal.

33. The laser according to claim 32 wherein said second harmonic nonlinear crystal is selected from the group LBO, BBO, KTP and CLBO crystals.

34. The laser according to claim 32 wherein said second harmonic nonlinear crystal is cut for critical phase matching.

35. The laser according to claim 34 wherein said nonlinear crystal is a LBO crystal.

36. The laser according to claim 32 wherein said nonlinear crystal is an LBO crystal.

37. The laser according to claim 36 wherein said nonlinear crystal is cut for non-critical phase matching.

38. The laser according to claim 31 wherein said second harmonic generator is a LBO crystal cut for critical phase matching and the third harmonic generator is a LBO crystal oriented to at least partially compensate for walk off generated from said second harmonic generator.

* * * * *